(12) United States Patent
Cadman et al.

(10) Patent No.: US 7,984,785 B2
(45) Date of Patent: Jul. 26, 2011

(54) CONTROL VALVE ASSEMBLY FOR ELECTRO-HYDRAULIC STEERING SYSTEM

(75) Inventors: John Michael Cadman, Eden Prairie, MN (US); Nathan Harold French, Prior Lake, MN (US); Wade Leo Gehlhoff, Shakopee, MN (US); Robin Francis Ireton, Searcy, AR (US)

(73) Assignee: Eaton Corporation, Cleveland, OH (US)

( * ) Notice: Subject to any disclaimer, the term of this patent is extended or adjusted under 35 U.S.C. 154(b) by 671 days.

(21) Appl. No.: 12/039,599

(22) Filed: Feb. 28, 2008

(65) Prior Publication Data

US 2009/0218161 A1 Sep. 3, 2009

(51) Int. Cl.
*B62D 5/08* (2006.01)
*B62D 5/06* (2006.01)
(52) U.S. Cl. .................................. 180/441; 180/417
(58) Field of Classification Search .............. 180/417, 180/420, 421, 422, 441
See application file for complete search history.

(56) References Cited

U.S. PATENT DOCUMENTS

| | | | |
|---|---|---|---|
| 3,455,210 A | 7/1969 | Allen | |
| 3,566,749 A * | 3/1971 | Allen et al. | 91/445 |
| 3,801,239 A | 4/1974 | Larson | |
| 3,819,307 A | 6/1974 | Uppal | |
| 3,960,234 A | 6/1976 | Morgan | |
| 4,077,484 A | 3/1978 | Dezelan | |
| 4,096,883 A | 6/1978 | Yip | |
| RE31,125 E * | 1/1983 | Dwyer | 60/386 |
| 4,555,978 A | 12/1985 | Burandt | |
| 4,665,939 A | 5/1987 | Kreth | |
| 5,020,618 A | 6/1991 | Nagao | |
| 5,267,628 A * | 12/1993 | Tomiyoshi et al. | 180/420 |
| 5,303,636 A * | 4/1994 | Stephenson et al. | 91/471 |
| 5,806,561 A | 9/1998 | Pedersen | |
| 5,918,558 A | 7/1999 | Susag | |

(Continued)

FOREIGN PATENT DOCUMENTS

EP 1020343 7/2000

(Continued)

OTHER PUBLICATIONS

PTS9-8, Pilot to Shift Valve, Eaton Vickers Screw-In Cartridge Valves; V-VLOV-MC001-E4, Sep. 2007, 2 pages.

(Continued)

*Primary Examiner* — Joanne Silbermann
*Assistant Examiner* — Daniel Yeagley
(74) *Attorney, Agent, or Firm* — Merchant & Gould P.C.

(57) ABSTRACT

A steering system includes a fluid pump and an electro-hydraulic steering circuit in selective fluid communication with the fluid pump. The electro-hydraulic steering circuit defines a first flow path having a first proportional valve and a first load-sense passage in selective communication with the first proportional valve. The first proportional valve includes a closed position. A hydrostatic steering circuit is in selective fluid communication with the fluid pump and defines a second flow path having a second proportional valve and a second load-sense passage in selective fluid communication with the second proportional valve. The second flow path is in a parallel flow configuration with the first flow path. An isolation valve is disposed in the first flow path in series with the first proportional valve. The isolation valve includes a closed position and is piloted to the closed position by fluid communicated through the second load-sense passage.

17 Claims, 4 Drawing Sheets

U.S. PATENT DOCUMENTS

| | | | |
|---|---|---|---|
| 5,992,458 A | 11/1999 | Novacek et al. | |
| 6,539,710 B2 | 4/2003 | Draper | |
| 7,142,956 B2 | 11/2006 | Heiniger | |
| 7,185,730 B2 * | 3/2007 | Schmidt et al. | 180/403 |
| 7,610,989 B2 * | 11/2009 | Vigholm et al. | 180/418 |
| 2005/0205337 A1 | 9/2005 | Porskrog et al. | |
| 2006/0248883 A1 * | 11/2006 | Gehlhoff | 60/469 |

FOREIGN PATENT DOCUMENTS

EP        1295778 A1 *   3/2003

OTHER PUBLICATIONS

International Search Report and Written Opinion mailed Jun. 12, 2009.

\* cited by examiner

CONTROL VALVE ASSEMBLY FOR ELECTRO-HYDRAULIC STEERING SYSTEM

BACKGROUND

Electro-hydraulic steering systems are slowly being implemented in various off-highway vehicles. However, the rate of acceptance of these steering systems by equipment manufacturers is low due to the manufacturers' fear of failures in the systems that could affect the steering of the off-highway vehicle. Therefore, what is needed is an electro-hydraulic steering system having features that address these concerns.

SUMMARY

An aspect of the present disclosure relates to a steering system including a control valve assembly having a proportional valve and an isolation valve in series with the proportional valve.

Another aspect of the present disclosure relates to a steering system including a control valve assembly having a first load-sense passage and a second load-sense passage in selective fluid communication with a load-sense switching valve.

Another aspect of the present disclosure relates to a control valve assembly for an electro-hydraulic steering system including a control valve assembly. The control valve assembly includes a first flow path having a fluid inlet, a fluid outlet, a first actuation outlet and a second actuation outlet. The first flow path is adapted to communicate fluid between the fluid inlet and outlet and the first and second actuation outlets. An isolation valve system includes an isolation valve disposed in the first flow path and adapted to provide selective fluid communication between the fluid inlet and one of the first and second actuation outlets. The isolation valve having a first end and a second end. The first end of the isolation valve is adapted for actuation to a closed position by a second flow path that is in a parallel flow configuration with the first flow path. The isolation valve system provides priority to the second flow path.

Another aspect of the present disclosure relates to an off-highway vehicle steering system. The off-highway vehicle steering system includes a steering circuit having a control valve assembly including a first flow path having a fluid inlet port, a fluid outlet port, a first actuation port and a second actuation port. The first flow path defines a first load-sense passage. A proportional valve is disposed in the first flow path between the fluid inlet port and the first and second actuation ports. The proportional valve is adapted to provide selective fluid communication between the fluid inlet port and the first and second fluid actuation ports and between the fluid inlet and the first load-sense passage. A load-sense switching valve is in selective fluid communication with the first load-sense passage and a second load-sense passage. The second load-sense passage is adapted to be in fluid communication with a second flow path. The load-sense switching valve is pilot operated.

Another aspect of the present disclosure relates to a steering system having a fluid pump and an electro-hydraulic steering circuit in selective fluid communication with the fluid pump. The electro-hydraulic steering circuit defines a first flow path having a first proportional valve and a first load-sense passage in selective communication with the first proportional valve. The first proportional valve includes a closed position. A hydrostatic steering circuit is in selective fluid communication with the fluid pump and defines a second flow path having a second proportional valve and a second load-sense passage in selective fluid communication with the second proportional valve. The second flow path is in a parallel flow configuration with the first flow path. An isolation valve is disposed in the first flow path in series with the first proportional valve. The isolation valve includes a closed position and is piloted to the closed position by fluid communicated through the second load-sense passage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
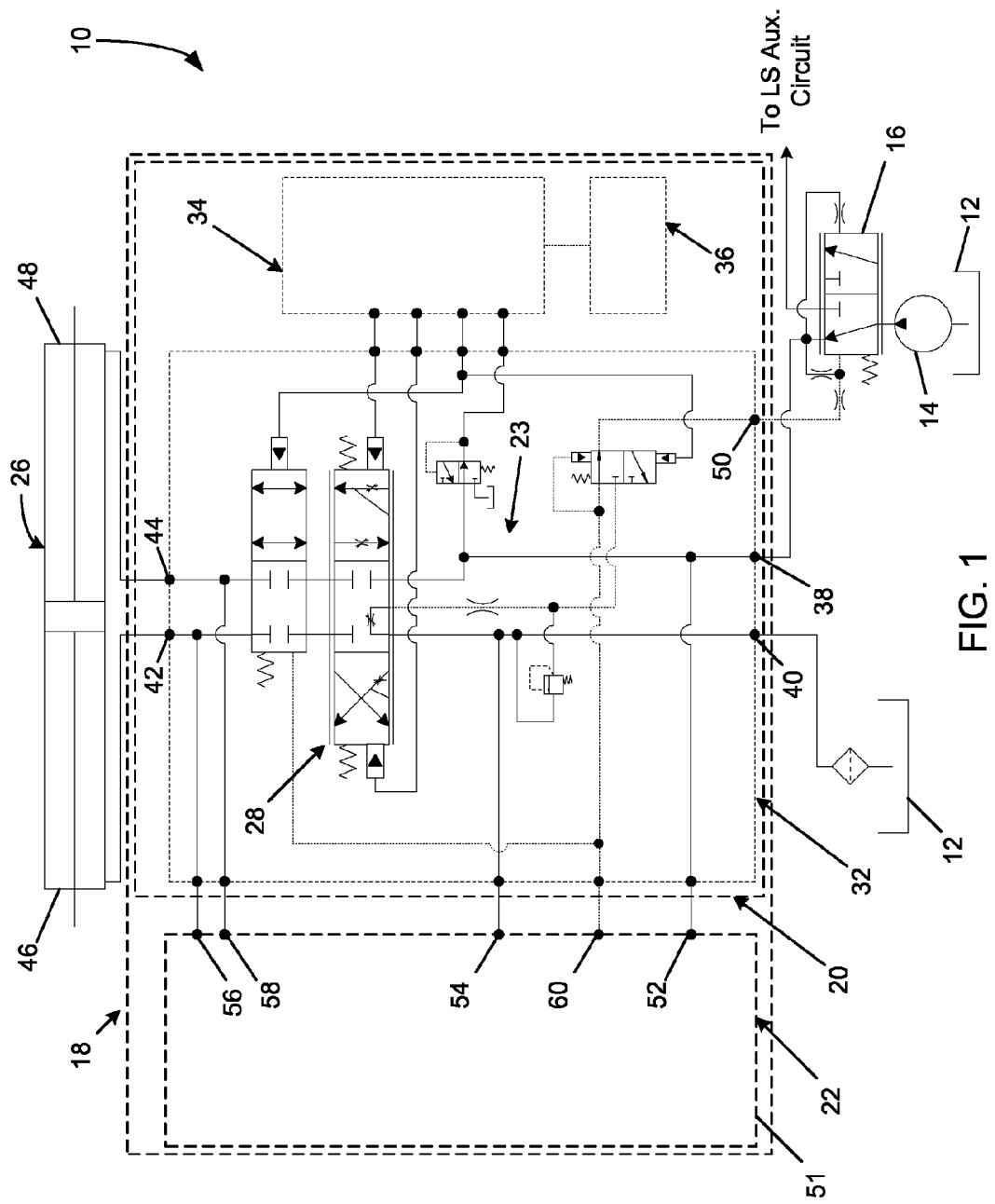
FIG. 1 is a hydraulic schematic of a steering system having features that are examples of aspects in accordance with the principles of the present disclosure.

Referring now to FIG. 1, a hydraulic schematic of a steering system, generally designated 10, for an off-highway vehicle (e.g., combine, tractor, etc.) is shown. The steering system 10 includes a reservoir 12 and a pump 14, shown herein as a fixed displacement pump, having an inlet in fluid communication with the reservoir 12. In the subject embodiment, an outlet of the pump is in fluid communication with a load-sense priority valve 16. The load-sense priority valve 16 apportions the flow of fluid from the pump 14 between a steering circuit, generally designated 18, and an auxiliary circuit. An example of a load-sense priority valve 16 suitable for use in the steering circuit 18 is provided in U.S. Pat. No. 3,455,210, which is hereby incorporated by reference in its entirety.

The steering circuit 18 further includes an electro-hydraulic steering circuit, generally designated 20, and a hydrostatic steering circuit, generally designated 22. The electro-hydraulic steering circuit 20 defines a first flow path 23 while the hydrostatic steering circuit 22 defines a second flow path 24 (shown in FIG. 2) in a parallel flow configuration to the first flow path 23. The first and second flow paths 23, 24 provide selective fluid communication between the pump 14 and a fluid actuator 26. In the subject embodiment, the first flow path 23 includes a first proportional valve 28 for selectively communicating fluid from the pump 14 to the fluid actuator 26 through the first flow path 23 while the second flow path 24 includes a second proportional valve 30 (shown in FIG. 2) for selectively communicating fluid from the pump 14 to the fluid actuator 26 through the second flow path 24.

The electro-hydraulic steering circuit 20 includes a control valve assembly, which is generally designated 32 and will be described in greater detail subsequently, a pilot valve assembly, generally designated 34, and a microcontroller 36. In the subject embodiment, the control valve assembly 32 defines an inlet 38 in fluid communication with the pump 14, an outlet 40 in fluid communication with the reservoir 12, a first actuator outlet 42 and a second actuator outlet 44. The first and second actuator outlets 42, 44 are in fluid communication with a first end 46 and an oppositely disposed second end 48, respectively, of the fluid actuator 26. The control valve assembly 32 further defines an auxiliary circuit port 50. In the subject embodiment, the auxiliary circuit port 50 is in fluid communication with the load-sense priority valve 16.

The hydrostatic steering circuit 22 includes a fluid controller 51. The fluid controller 51 defines a fluid inlet port 52 in fluid communication with the pump 14, a fluid outlet port 54 in fluid communication with the reservoir 12, a first control port 56, and a second control port 58. The first and second control ports 56, 58 are in fluid communication with the first and second ends 46, 48, respectively, of the fluid actuator 26. The fluid controller 51 further defines an auxiliary fluid port 60. In the subject embodiment, the auxiliary fluid port 60 is in selective communication with the load-sense priority valve 16.

While the electro-hydraulic and hydrostatic steering circuits 20, 22 have been described as having an auxiliary circuit port 50 and an auxiliary fluid port 60, respectively, it will be understood that scope of the present disclosure is not limited to the electro-hydraulic and hydrostatic steering circuits 20, 22 having an auxiliary circuit port 50 and an auxiliary fluid port 60, respectively.

Figure 2:
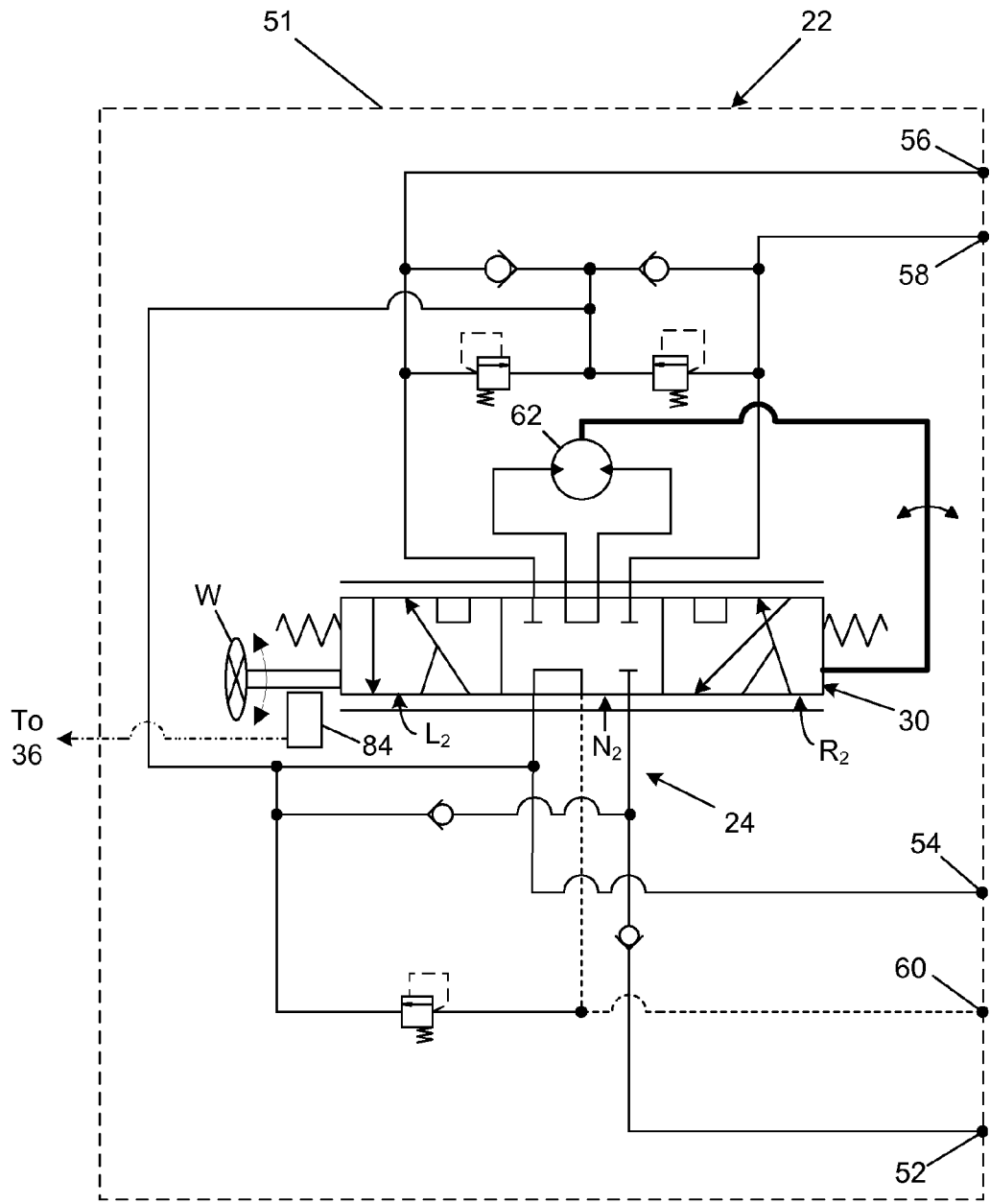
FIG. 2 is a hydraulic schematic of a hydrostatic steering circuit suitable for use with the steering system of FIG. 1.

Referring now to FIG. 2, the hydrostatic steering circuit 22 is shown. The hydrostatic steering circuit 22 defines the second flow path 24. The second flow path 24 communicates fluid from the fluid inlet port 52 to at least one of the first and second control ports 56, 58. In the subject embodiment, the second proportional valve 30 is disposed along the second flow path 24 between the fluid inlet port 52 and the first and second control ports 56, 58.

In the subject embodiment, the second proportional valve 30 is a valving assembly having a rotary valve (e.g., spool) and a follow-up valve member (e.g., sleeve). In the subject embodiment, the spool rotates within a bore of the sleeve as a result of manual actuation of a steering wheel W.

The second proportional valve 30 is movable from a neutral position $N_2$ (shown in FIG. 2) to a right turn position $R_2$ or a left turn position $L_2$ through the manual actuation of a steering wheel W. When the second proportional valve 30 is in either the right turn position $R_2$ or the left turn position $L_2$, fluid is communicated from the pump 14 and through a fluid meter 62 to one of the first and second ends 46, 48 of the fluid actuator 26.

Examples of a fluid controller 51 that are suitable for use with aspects of the present disclosure are disclosed in U.S. Pat. Nos. 3,801,239, 3,819,307, 3,960,234 and 4,096,883, all of which are hereby incorporated by reference in their entirety. It will be understood, however, that the scope of the present disclosure is not limited to the second proportional valve 30 being of the type described in U.S. Pat. Nos. 3,801,239, 3,819,307, 3,960,234 and 4,096,883.

Figure 3:
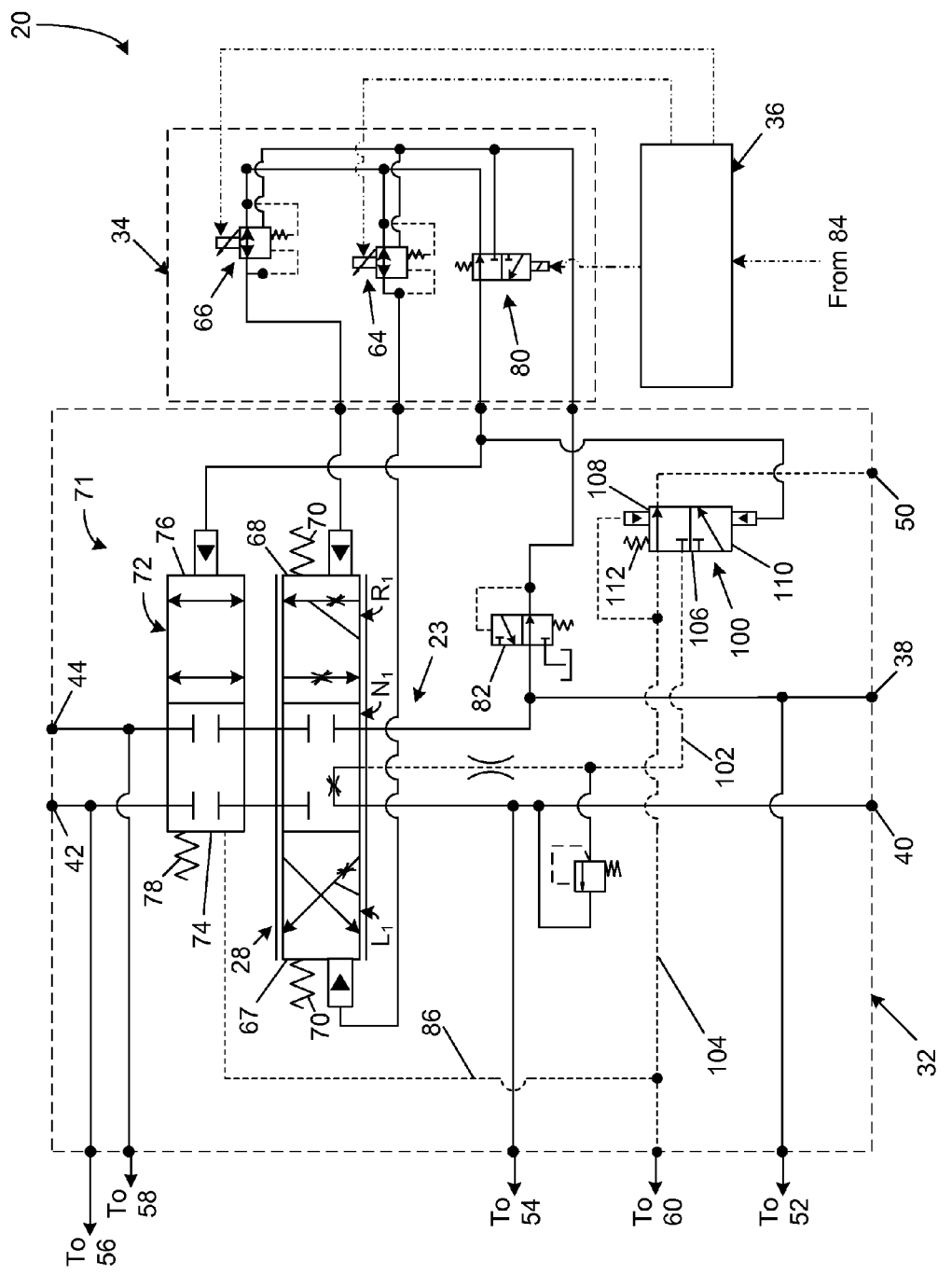
FIG. 3 is a hydraulic schematic of an electro-hydraulic steering circuit having features of aspects in accordance with the principles of the present disclosure.

Referring now to FIG. 3, the control valve assembly 32, the pilot valve assembly 34 and the microcontroller 36 of the electro-hydraulic steering circuit 20 are shown. In one embodiment, the control valve assembly 32 includes a valve block, disposed in which is a plurality of valves. The valve block can include first and second manifold mounts for mounting the pilot valve assembly 34 to the valve block and for mounting the valve block to the fluid controller 51. It will be understood, however, that the scope of the present disclosure is not limited to the control valve assembly 32 having a valve block or to the valve block having first and second manifold mounts.

The control valve assembly 32 defines the first flow path 23 from the inlet 38 to the first and second actuator outlets 42, 44. The first proportional valve 28 is disposed in the first flow path 23 between the inlet 38 and the first and second actuator outlets 42, 44. In the subject embodiment, and by way of example only, the first proportional valve 28 is a three-position, five-way valve. The first proportional valve 28 includes a neutral position $N_1$ (shown in FIG. 3), a right turn position $R_1$, and a left turn position $L_1$. In the subject embodiment, the neutral position $N_1$ is a closed position. It will be understood that the term "closed position" refers to a position in which fluid communication between the inlet 38 and one of the first and second actuator outlets 42, 44 is blocked. In other words, with the first proportional valve 28 in the neutral position $N_1$, fluid from the pump 14 cannot be communicated through the first flow path 23 to the fluid actuator 26 via the first and second actuator outlets 42, 44. The term "closed position" does not refer, however, to fluid communication between the inlet 38 and the outlet 40.

In the subject embodiment, the first proportional valve 28 is a pilot operated valve. To actuate the first proportional valve 28, pilot pressure is supplied by a first and second pilot valve 64, 66 of the pilot valve assembly 34 to a first and second end 67, 68, respectively, of the first proportional valve 28. If pressure is supplied to the first end 67 of the first proportional valve 28, the first proportional valve 28 is actuated to the left turn position $L_1$. If pressure is supplied to the second end 68 of the first proportional valve 28, the first proportional valve 28 is actuated to the right turn position $R_1$. When the pilot pressure is drained from the first and second ends 67, 68 of the first proportional valve 28 to the reservoir 12, centering springs 70 disposed at the first and second ends 67, 68 position the first proportional valve 28 in the neutral position $N_2$.

The control valve assembly 32 further includes an isolation valve system 71 disposed in the first flow path 23. The isolation valve system 71 includes an isolation valve 72. In the subject embodiment, the isolation valve 72 is disposed between the first proportional valve 28 and the first and second actuator outlets 42, 44 of the control valve assembly 32. In the subject embodiment, and by way of example only, the isolation valve 72 is a two-position, four-way valve. The isolation valve 72 includes a closed position (shown in FIG. 3) and an open position. In the closed position, the flow of fluid between the first proportional valve 28 and the fluid actuator 26 is blocked. In the open position, fluid passing through the first proportional valve 28 flows through the isolation valve 72 into the fluid actuator 26.

The isolation valve 72 includes a first end 74 and an oppositely disposed second end 76. In the subject embodiment, the first end 74 is in fluid communication with the second flow path 24 while the second end 76 is in fluid communication with the first flow path 23. To actuate the isolation valve 72 between the closed and open positions, a first force and a second force are selectively applied to the first and second ends 74, 76 of the isolation valve 72. For example, in order to actuate the isolation valve 72 to the closed position, fluid from the second flow path 24 is communicated to the first end 74 so that the first force acts on the first end 74 of the isolation valve 72. In order to actuate the isolation valve 72 to the open position, the first force is relieved from the first end 74 while the second force is applied to the second end 76.

In order to provide stability to the steering circuit 18, the isolation valve system 71 provides priority to the second flow path 24. This prioritization of the second flow path over the first flow path allows for manual steering through the hydrostatic steering circuit 22 in the event of a system fault in the electro-hydraulic steering circuit 20. In the subject embodiment, priority is provided to the second flow path 24 through the isolation valve system 71 by having the first force applied to the first end 74 of the isolation valve 72 be greater than the second force applied to the second end 76. With the first force being greater than the second force, the isolation valve 72 is biased to the closed position whenever a system fault occurs and the first end 74 of the isolation valve 72 is piloted simultaneously with the second end 76.

In one embodiment, a spring 78 accounts for difference between the first force and the second force applied to the first and second ends 74, 76 of the isolation valve 72. The spring 78 is disposed at the first end 74 of the isolation valve 72 and works cumulatively with the pilot pressure supplied to the first end 74 to shift the isolation valve 72 to the closed position. In this embodiment, if the pressure of the fluids communicated to both the first and second ends 74, 76 simultaneously are equal, the spring 78 will bias the isolation valve 72 to the closed position.

In another embodiment, the pressure of the fluid communicated to the second end 76 of the isolation valve 72 is maintained at a lower pressure than the fluid communicated to the first end 74. If the fluid communicated to the first end 74 and the fluid communicated to the second end 76 originate from the same fluid source, flow control devices (e.g., pressure reducing valves, orifices, etc.) can be used to reduce the pressure of the fluid communicated to the second end 76.

For example, in the subject embodiment, fluid is supplied to the second end 76 of the isolation valve 72 by a third pilot valve 80 of the pilot valve assembly 34. The pressure of the fluid from the third pilot valve 80 is at a reduced pressure from fluid supplied to the inlet 38 of the control assembly 32 by the pump 14. In the subject embodiment, the pressure of the fluid communicated to second end 76 of the isolation valve 72 through the third pilot valve 80 from the inlet 38 is reduced through a pressure reducing valve 82 of the isolation valve system 71. In the subject embodiment, and by way of example only, the pressure reducing valve 82 of the isolation valve system 71 maintains the pressure of fluid communicated to the third pilot valve 80 at a value less than or equal to 500 psi. In one embodiment, and by way of example only, the pressure reducing valve 82 maintains the pressure of the fluid communicated to the third pilot valve 80 at a value less than or equal to about 250 psi, or less than or equal to about 150 psi. If fluid is not being actively communicated to the first end 74 of the isolation valve 72, the second force resulting from the pressure of the fluid acting on the second end 76 of the isolation valve 72 causes the isolation valve 72 to overcome the force of the spring 78 at the first end 74 and thereby move the isolation valve 72 to the open position.

In the subject embodiment, the first, second and third pilot valves 64, 66, 80 are solenoid valves that are actuated in response to signals sent from the microcontroller 36. In one aspect of the present disclosure, the microcontroller 36 receives information from a Global Positioning System receiver related to the location, direction, and speed of the vehicle. The microcontroller 36 also receives a signal from a sensor 84 of the hydrostatic steering circuit 22 concerning the actuation of the second proportional valve 30. In one embodiment, the sensor 84 is a steering column position sensor 84 which monitors the actuation of the steering wheel W.

In operation, if use of the hydrostatic steering circuit 22 is desired, the steering wheel W of the hydrostatic steering circuit 22 is rotated. As the steering wheel W is rotated, the spool of the second proportional valve 30 is displaced relative to the sleeve. This relative displacement opens the second flow path 24 thereby allowing fluid to flow from the fluid inlet port 52 to the fluid actuator 26. The steering column position sensor 84 senses this change in position of the steering column and transmits a signal to the microcontroller 36. In response to the actuation of the steering wheel W, which opens the second flow path 24 in the hydrostatic steering circuit 22, the microcontroller 36 transmits signals to the first, second, and third pilot valves 64, 66, 80 to actuate the first proportional valve 28 and the isolation valve 72 such that the first flow path 23 is blocked. By blocking the first flow path 23 while the second flow path 24 is being utilized, the microcontroller 36 ensures the stability of the steering circuit 18 by preventing the first and second flow paths 23, 24 from being operated simultaneously.

If use of the electro-hydraulic steering circuit 20 is desired and the second proportional valve 30 in the second flow path 24 of the hydrostatic steering circuit 22 is in the closed position (or the neutral position $N_2$ shown in FIG. 2), the microcontroller 36 sends electronic signals to each of the first, second and third pilot valves 64, 66, 80 to open the first proportional valve 28 and the isolation valve 72 in accordance with information received from the GPS receiver and the steering column position sensor 84 to maneuver the vehicle along a predefined route.

As the first proportional valve 28 includes a closed position that substantially blocks the flow of fluid between the inlet 38 and the fluid actuator 26 and the isolation valve 72 of the isolation valve system 71 also includes a closed position that substantially blocks the flow of fluid between the inlet 38 and the fluid actuator 26, the first proportional valve 28 and the isolation valve system 71 cooperatively provide a fault tolerant feature to the electro-hydraulic steering circuit 20. For example, if the steering column position sensor 84 sends a signal to the microcontroller 36 that the second proportional valve 30 is open such that fluid is flowing through the second flow path 24, the microcontroller 36 sends signals to the first, second and third pilot valves 64, 66, 80 to block fluid flow through the first flow path 23. If, however, the first proportional valve 28 does not move to the fully closed position, the flow of fluid through the first flow path 23 is still blocked by the actuation of the isolation valve 72. Therefore, the isolation valve system 71 acts as a backup for the closed position of the first proportional valve 28.

In one aspect of the present disclosure, the first end 74 of the isolation valve 72 is piloted by pressurized fluid from a load-sense passage 86. In the subject embodiment, the load-sense passageway 86 is in fluid communication with the second proportional valve 30 of the second flow path 24 through the auxiliary fluid port 60. As the second proportional valve 30 is actuated, pressurized fluid is communicated from the second proportional valve 30 to the auxiliary fluid port 60 of the hydrostatic steering circuit 22. In the subject embodiment, this pressurized fluid is communicated to the first end 74 of the isolation valve 72 through the load-sense passageway 86 to assure that the isolation valve 72 is in the closed position. Since the pressure of the fluid piloting the second end 76 of the isolation valve 72 is reduced through the pressure reducing valve 82 of the isolation valve system 71, the pressure of fluid being applied to the first end 74 of the isolation valve 72 from the second flow path 24 when the second proportional valve 30 is manually actuated is able to overcome the pressure piloting the second end 76. This priority feature of the isolation valve system 71 allows the user to override the microcontroller 36 in the event of a fault that results in the first proportional valve 28 and the isolation valve 72 being left in an open position.

In addition to overriding a fault in the steering system, the application of a larger first force at the first end 74 of the isolation valve 72 as compared to the second force at the second end 76 allows for the isolation valve 72 to be moved into a closed position in the event that contamination within the isolation valve 72 is preventing the isolation valve 72 from closing.

Referring still to FIG. 3, a load-sense switching circuit, generally designated 100, is shown. While the depicted embodiments of FIGS. 1 and 3 illustrate the load-sense switching circuit 100 being used with the isolation valve 72, it will be understood that the scope of the present disclosure includes an electro-hydraulic steering circuit 20 having only one of the isolation valve 72 and the load-sense switching circuit 100.

In the subject embodiment, the control valve assembly 32 includes a first load-sense passage 102 and a second load-sense passage 104. The first load-sense passage 102 is in fluid communication with the pump 14 through the first proportional valve 28 of the first flow path 23 of the electro-hydraulic steering circuit 20 and is in selective communication with the auxiliary circuit port 50.

The second load-sense passage 104 is in fluid communication with the pump 14 through the second proportional valve 30 of the second flow path 24 of the hydrostatic steering circuit 22. In the subject embodiment, the second load-sense passage 104 communicates with the second proportional valve 30 through the auxiliary fluid port 60 of the hydrostatic steering circuit 22.

During operation of the steering system 10, the first and second load-sense passages 102, 104 receive pressurized fluid from the first and second proportional valves 28, 30, respectively, depending on whether the electro-hydraulic steering circuit 20 or the hydrostatic steering circuit 22 is being used. The pressure of the fluids in the first and second load-sense passages 102, 104 are selectively communicated to the load-sense priority valve 16. The load-sense priority valve 16 apportions the flow of fluid from the pump 14 between the steering circuit 18 and the auxiliary circuit. This flow apportionment is based on the requirements of the steering circuit 18. If the steering circuit 18 requires more flow, the pressure of the fluid in the first and second load-sense passages 102, 104 shifts the load-sense priority valve 16 into a first position (shown in FIG. 1). If the pump 14 is producing more fluid than is being used by the steering circuit 18, the pressure of the fluid from the pump shifts the load-sense priority valve 16 into a second position that communicates fluid to an auxiliary circuit.

In the subject embodiment, the load-sense switching circuit 100 provides fluid from one of the first and second load-sense passages 102, 104 to the load sense priority valve 16 to actuate the load-sense priority valve 16 such that the electro-hydraulic or hydrostatic steering circuits 20, 22 are given priority over auxiliary circuits for receiving fluid from the pump 14. In order to provide stability to the steering circuit 18, the load-sense switching circuit 100 provides priority to the second flow path 24. This prioritization of the second flow path 24 over the first flow path 23 allows for flow from the second flow path 24 to be communicated to the load-sense priority valve 16 in the event of a system fault in the electro-hydraulic steering circuit 20 thereby allowing prioritization of fluid flow between the steering circuit 18 and the auxiliary circuit to be based on the hydrostatic steering circuit 22 in the event of a fault in the electro-hydraulic steering circuit 20.

The load-sense switching circuit 100 includes a load-sense switching valve 106. In the subject embodiment, the load-sense switching valve 106 is a pilot operated two-position, three-way valve that includes a first end 108 and a second end 110. A first switching force is selectively applied to the first end 108 of the load-sense switching valve 106 while a second switching force is selectively applied to the second end 110. In one aspect of the present disclosure, the first switching force that acts on the first end 108 of the load-sense switching valve 106 is greater than the second switching force that acts on the second end 110. With first switching force applied at the first end 108 of the load-sense switching valve 106 being greater than the second switching force applied at the second end 110, the load-sense switching valve 106 is biased to the position in which fluid from the second flow path 24 is communicated to the load-sense priority valve 16 whenever a system fault results in the first and second ends 108, 110 of the load-sense switching valve 106 being piloted simultaneously.

In the subject embodiment, the external source is the third pilot valve 80, which is in fluid communication with the pump 14. In the subject embodiment, the third pilot valve 80 is a solenoid valve that is controlled by the microcontroller 36.

In the depicted embodiment, a valve spring 112 is disposed at the first end 108 of the load-sense switching valve 106. In addition, pressurized fluid from the second load-sense passage 104 is supplied to the first end 108 of the load-sense switching valve 106. In the subject embodiment, the force from the valve spring 112 and the pressurize fluid from the second load-sense passage 104 acting on the first end 108 cumulatively define the first switching force. The valve spring 112 and pressurized fluid from the second load-sense passage 104 bias the load-sense switching valve 106 to a first position (shown in FIGS. 1 and 3). In the first position, the pressurized fluid from the second proportional valve 30 of the hydrostatic steering circuit 22 is in fluid communication with the load-sense priority valve 16.

In the subject embodiment, the load-sense switching valve 106 is actuated to a second position by pressurized fluid from the third pilot valve 80. In the subject embodiment, the pressurized fluid from the third pilot valve 80 acting on the second end 110 of the load-sense switching valve 106 defines the second switching force. In one embodiment, the third pilot valve 80 is a solenoid valve. The microcontroller 36 actuates the third pilot valve 80 which communicates pilot pressure to the second end 110 of the load-sense switching valve 106. When the external source pilots the second end 110 of the load-sense switching valve 106, pressurized fluid from the first proportional valve 28 is communicated to the load-sense priority valve 16.

In operation, when fluid flows through the second flow path 24 of the hydrostatic steering circuit 22, pressurized fluid from the second proportional valve 30 is supplied to the first end 108 of the load-sense switching valve 106 while any fluid at the second end 110 of the load-sense switching valve 106 is drained to the reservoir 12. The pressurized fluid acting on the first end 108 of the load-sense switching valve 106 actuates the load-sense switching valve 106 to the first position, which allows pressurized fluid from the second proportional valve 30 to be communicated to the load-sense priority valve 16. Alternatively, when fluid flows through the first flow path 23 of the electro-hydraulic steering circuit 20, pressurized fluid from the third pilot valve 80 is supplied to the second end 110 of the load-sense switching valve 106 while any fluid at the first end 108 of the load-sense switching valve 106 is drained to the reservoir 12. The pressurized fluid acting on the second end 110 of the load-sense switching valve 106 actuates the load-sense switching valve 106 to the second position, which allows pressurized fluid from the first proportional valve 28 to be communicated to the load-sense priority valve 16.

Figure 4:
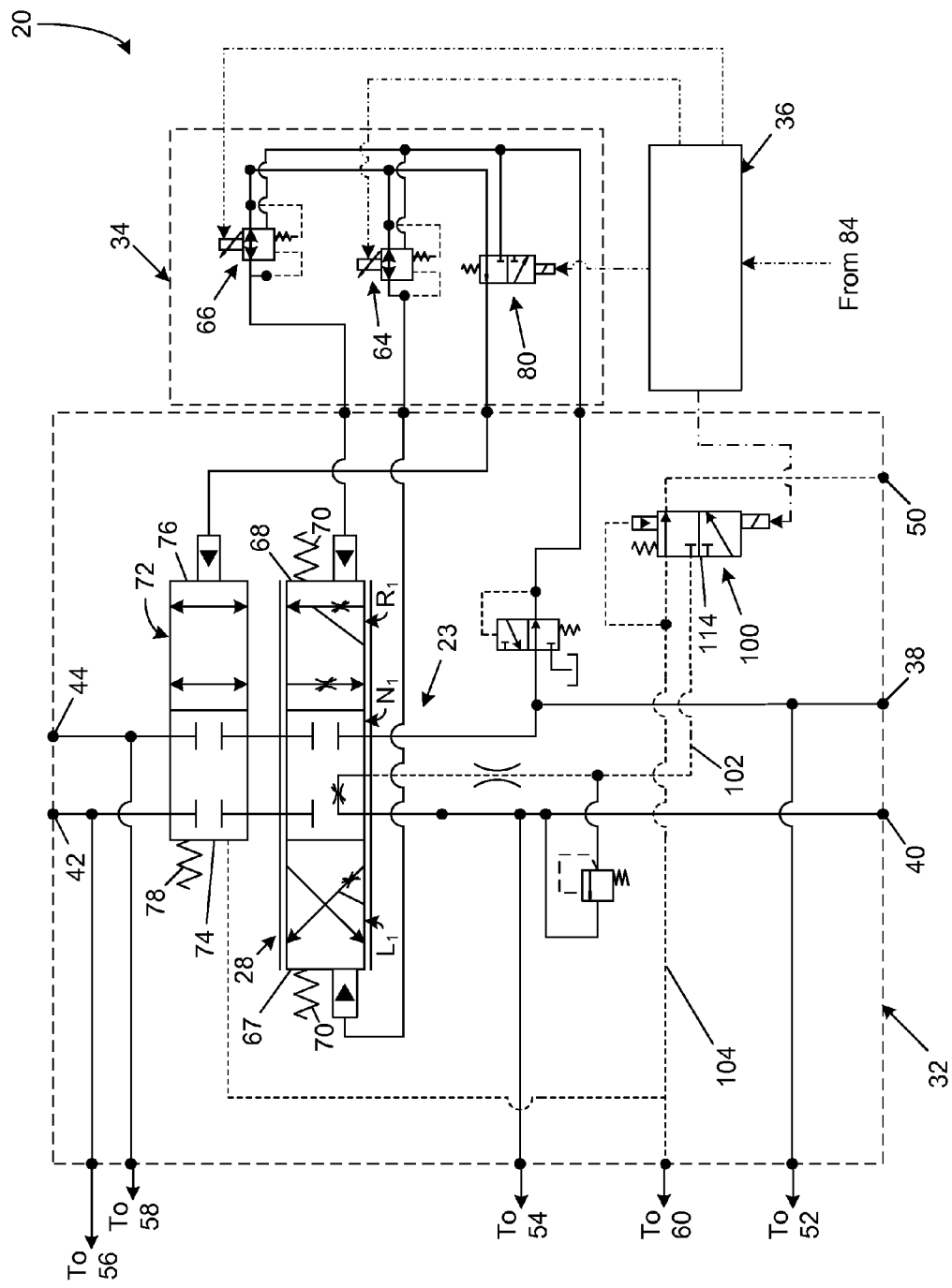
FIG. 4 is a hydraulic schematic of an alternate embodiment of a load-sense switching valve of the electro-hydraulic steering circuit of FIG. 3.

Referring now to FIG. 4, an alternate embodiment of a load-sense switching valve 114 is shown. In the depicted embodiment of FIG. 4, the load-sense switching valve 114 is a solenoid valve that is directly piloted by the microcontroller 36.

Referring now to FIGS. 1 and 3, the load-sense switching valve 106 provides a potential advantage over a typical shuttle valve arrangement when the flow rate through one of the first and second flow paths 23, 24 is low. When the flow rate through one of the first and second flow paths 23, 24 is low, the pressure differential between pressurized fluid from the electro-hydraulic steering circuit 20 and the pressurized fluid from the hydrostatic steering circuit 22 is relatively small. As a result, pressure losses through the shuttle valve arrangement may cause pressurized fluid from the inactive flow path to have a higher pressure than pressurized fluid from the active flow path, which results in the shuttle valve arrangement being shifted erroneously. The erroneous shifting of the shuttle valve arrangement makes the shuttle valve arrangement unstable, which affects the performance of the steering system 10.

The load-sense switching valve 106 of the present disclosure eliminates this erroneous shifting by using the load-sense switching valve 106 that is pilot operated. In the subject embodiment, pilot operation of the second end 110 of the load-sense switching valve 106 shifts the load-sense switching valve 106 when the electro-hydraulic steering circuit 20 is in use. In addition, the first end 108 of the load-sense switching valve 106 is piloted by pressurized fluid from the second proportional valve 30 of the hydrostatic steering circuit 22. By having pressurized fluid from the second proportional valve 30 of the hydrostatic steering circuit 22 provide pilot pressure to the first end 108 of the load-sense switching valve 106, the operator of the vehicle is able to actuate the load-sense switching valve 106 by manually actuating the second proportional valve 30. Therefore, by manually actuating the second proportional valve 30 of the hydrostatic steering circuit 22, the operator is able to actuate the load-sense switching valve 106 such that the pressurized fluid from the second proportional valve 30 is communicated to the load-sense priority valve 16.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A control valve assembly for an electro-hydraulic steering system comprising:
   a first flow path having a fluid inlet, a fluid outlet, a first actuation outlet and a second actuation outlet, wherein the first flow path is adapted to communicate fluid between the fluid inlet, the fluid outlet and the first and second actuation outlets;
   a first proportional valve disposed in the first flow path, the first proportional valve having a closed position and being adapted to provide selective fluid communication between the fluid inlet and one of the first and second actuation outlets;
   a second flow path disposed in a parallel configuration with the first flow path, the second flow path having a fluid inlet port, a fluid outlet port, a first control port and a second control port;
   a second proportional valve disposed in the second flow path, the second proportional valve being adapted to provide selective fluid communication between the fluid inlet port and one of the first and second control ports;
   an isolation valve system disposed in the first flow path, the isolation valve system being actuated between an open position, in which fluid can be selectively communicated between the fluid inlet and the first and second actuation outlets of the first flow path, and a closed position, in which fluid communication between the fluid inlet and the first and second actuation outlets is blocked, the isolation valve system including an isolation valve being disposed in series with the first proportional valve and having a first end and a second end, the isolation valve being adapted for actuation to the closed position by fluid communicated to the first end from the second flow path, wherein the isolation valve system provides priority to the second flow path.

2. A control valve assembly for an electro-hydraulic steering system as claimed in claim 1, wherein the isolation valve is disposed in the first flow path between the first proportional valve and the first and second actuation outlets.

3. A control valve assembly for an electro-hydraulic steering system as claimed in claim 1, wherein the isolation valve system includes a spring disposed at the first end of the isolation valve.

4. A control valve assembly for an electro-hydraulic steering system as claimed in claim 1, wherein the isolation valve system includes a pressure reducing valve for reducing the pressure of fluid piloting the second end of the isolation valve.

5. A control valve assembly for an electro-hydraulic steering system as claimed in claim 1, further comprising a load-sense switching valve in selective fluid communication with a first load-sense passage in fluid communication with the first flow path and a second load-sense passage, the second load-sense passage being adapted to be in fluid communication with the second flow path, wherein the load-sense switching valve provides priority to the second flow path.

6. A steering system comprising:
   a fluid pump;
   an electro-hydraulic steering circuit in selective fluid communication with the fluid pump, the electro-hydraulic steering circuit defining a first flow path having a first proportional valve and a first load-sense passage in selective fluid communication with the first proportional valve, wherein the first proportional valve includes a closed position;
   a hydrostatic steering circuit in selective fluid communication with the fluid pump, the hydrostatic steering circuit defining a second flow path having a second proportional valve and a second load-sense passage in selective fluid communication with the second proportional valve, wherein the second flow path is in a parallel flow configuration with the first flow path; and
   an isolation valve disposed in the first flow path, the isolation valve being in series with the first proportional valve and having a closed position, in which fluid communication through the first flow path is blocked, wherein the isolation valve is piloted to the closed position by fluid communicated through the second load-sense passage.

7. A steering system as claimed in claim 6, further comprising a microcontroller for actuating the isolation valve to an open position.

8. A steering system as claimed in claim 6, wherein the isolation valve includes a first end in fluid communication with the second load-sense passage and a second end in fluid communication with a pressure reducing valve and a pilot valve, wherein fluid communicated to the second end of the isolation valve actuates the isolation valve into an open position.

9. A steering system as claimed in claim 8, wherein the pressure reducing valve is in fluid communication with the fluid pump.

10. A steering system as claimed in claim 9, wherein the pressure reducing valve reduces the pressure to the fluid to less than or equal to about 500 psi.

11. A steering system as claimed in claim 6, further comprising a load-sense priority valve being in fluid communication with the fluid pump and being in selective fluid communication with the electro-hydraulic and hydrostatic steering circuits and an auxiliary circuit.

12. A steering system as claimed in claim 11, further comprising a load-sense switching valve in selective fluid communication with the first and second load-sense passages and the load-sense priority valve.

13. A steering system as claimed in claim 12, wherein the load-sense switching valve includes a first end and a second end with the first and second ends being pilot operated.

14. A method for controlling an electro-hydraulic steering circuit comprising:
 providing a first flow path between a fluid pump and a fluid actuator, the first flow path including a first proportional valve being adapted to provide selective fluid communication between the fluid pump and the fluid actuator;
 providing a second flow path between a fluid pump and a fluid actuator, the second flow path being disposed in a parallel flow configuration with the first flow path, the second flow path including a second proportional valve being adapted to provide selective fluid communication between the fluid pump and the fluid actuator;
 providing an isolation valve in the first flow path in series with the first proportional valve, the isolation valve having an open position, in which fluid can be communicated through the first flow path, and a closed position, in which fluid communication through the first flow path is blocked, wherein the isolation valve is actuated to the closed position by a first force acting on a first end of the isolation valve and to the open position by a second force acting on a second end of the isolation valve; and
 applying the first force to the first end of the isolation valve, wherein the first force is greater than the second force so that the first force overcomes the second force in the event the first and second forces act on the first and second ends simultaneously.

15. A method for controlling an electro-hydraulic steering circuit as claimed in claim 14, wherein the isolation valve is disposed in the first flow path between the first proportional valve and the fluid actuator.

16. A method for controlling an electro-hydraulic steering circuit as claimed in claim 14, wherein a portion of the first force is supplied by a spring disposed at the first end of the isolation valve.

17. A method for controlling an electro-hydraulic steering circuit as claimed in claim 14, wherein the second force results from pressurized fluid from a pressure reducing valve acting on the second end.

* * * * *